May 8, 1962 R. A. FRYKLUND 3,033,102
AUTOMATIC CABLE LACING MACHINE
Filed April 13, 1959 9 Sheets-Sheet 2

May 8, 1962  R. A. FRYKLUND  3,033,102
AUTOMATIC CABLE LACING MACHINE

Filed April 13, 1959  9 Sheets-Sheet 3

May 8, 1962  R. A. FRYKLUND  3,033,102
AUTOMATIC CABLE LACING MACHINE
Filed April 13, 1959  9 Sheets-Sheet 4

May 8, 1962 R. A. FRYKLUND 3,033,102
AUTOMATIC CABLE LACING MACHINE
Filed April 13, 1959 9 Sheets-Sheet 5

May 8, 1962 R. A. FRYKLUND 3,033,102
AUTOMATIC CABLE LACING MACHINE
Filed April 13, 1959 9 Sheets-Sheet 6

3,033,102
AUTOMATIC CABLE LACING MACHINE
Robert A. Fryklund, Dedham, Mass., assignor to International Business Machines Corporation, New York, N.Y., a corporation of New York
Filed Apr. 13, 1959, Ser. No. 806,175
11 Claims. (Cl. 100—14)

This invention relates to automation and particularly to program controlled machinery for lacing bundles of strands, such as wires, into a cable harness useful in electrical apparatus.

The object of the invention is to provide means for moving a lacing device along the various sections of an assembly of wires laid out into the cable form of a harness and to securely bind each bundle of wires similar to the manner in which bundles have heretofore been laced by hand.

The invention consists of a set of fingers including a needle and a gripper which at any given point to which it may be moved will straddle a bundle of wires, compact them tightly, pass a lace thereabout, entwine the lace into a binder and snip the loose ends thereof, thereafter moving to another location where the operation will be repeated. Attention is directed to the pending application of Donald H. Fryklund for a Card Programmed Cable Harness Machine, Serial Number 693,584, filed October 31, 1957, by which a wire laying head may be automatically moved along predetermined paths in two coordinate directions to pay out wires to form a cable harness. The lacing device of the present invention may be moved from point to point along the said bundles of wires by the same sort of mechanism and under similar programmed control. The novel features of the present invention reside in the means for binding the bundles of wires as well as the automatic movement of the binding means to a succession of predetermined locations at each of which a binding operation is carried out.

The binding operation consists of a movement of a needle and gripper to pass a lace beneath a bundle of strands, to then encircle the lace about the said bundle, to entwine the ends of the lace, to secure the said entwined ends of the lace and to thereafter sever the said lace at the nose of the needle to leave a tightened and secured loop of lace about the said bundle of strands. The said lace, in a preferred embodiment of the present invention, consists of thermoplastic material having a considerable tensile strength and capable of being secured into a permanent loop by heat, as by welding. Such material has excellent insulating properties and being a nonconductor will not cause adverse effects through the interlinkage of a large plurality of such loops with any of the conductors in the harness cables.

In accordance with the present invention, the device which may be termed a lacing head, when moved coordinately to any given location will move a needle and gripper astraddle a bundle of wires and then move the needle toward the gripper, whereupon the gripper will grasp the end of a lace protruding from the end of the needle. Thereupon both the needle and the gripper will move to a point above the bundle of wires. When the needle and gripper are then rotated about an axis perpendicular to the bundle of wires, such bundle will be tightly encircled by the said lace. The ends of the lace are then secured and the lace is severed just beyond the end of the needle. The said lace may be constructed of a thermoplastic material so that the securing of the encircling lace is carried out by the application of heat to the entwined ends thereof. This may be done by the application of high frequency current to the metallic parts between which the entwined ends of the thermoplastic lace are squeezed.

While this is conventional, it may be noted that the power absorbed in this dielectric welding operation is proportional to the Area × Power Factor × Frequency × Dielectric Constant × Voltage squared, and divided by the distance between the electrodes.

In accordance with a preferred embodiment of the invention the operation of the device is controlled by a variable program means and a built in invariable program means, the movement of the lacing head being controlled by said variable means to locate the lacing head at various points along the cable harness and the operation of the lacing head upon arrival at each new location being controlled by invariable means.

The said invariable program means consists of a network of limit switches, each arranged to signal the end of a mechanical movement of some component of the lacing head, a plurality of control relays operated thereby and each capable of switching the circuits leading to heavy duty solenoids and magnets for causing the various mechanical movements of the said various components of the device. Many of such components are moved by pneumatic means controlled by said solenoids.

The lacing head consists of a main box-like structure having a plurality of supporting rollers attached thereto by which the device is rolled along the rails of the frame which moves in one coordinate direction from one to another row of fingers within which the strands have been laid. By means of the said supporting rollers, the said box-like structure may be moved along the said rails to bring the device and particularly the needle and gripper thereof into cooperative relationship with any particular set of fingers in the selected row thereof so that the lace may be entwined about the harness bundle of strands at any selected point. The coordinated movement of the said box-like structure is carried out in the manner completely set forth in the said Fryklund application.

The network of electrical connections and pneumatic tubes for operating the lacing head of the present invention comprises in general, three parts, first a control station which is fixed with regard to the frame over which the lacing head moves, second a flexible cable extending from the said fixed point to the said lacing head whereby the lacing head may move from point to point without disturbing the connections in said network, and third the circuitry within the lacing head. Included in this lacing head circuitry is an array of slip rings whereby the network connections between the stationary parts thereof and the movable parts thereof may be accommodated without disturbance since one of the movements of the device is a 180° rotation of the needle and gripper assembly. The first or fixed end of the said network may be located with and as part of the control cabinet from which the programmed coordinated movement of the lacing head is directed and it is at this point that the sources of potential and the compressed air for the pneumatic operations are supplied.

The source of lacing material may be a reel supported above the lacing head in a manner similar to the reel of wire supported by the wire feed head shown and described in the said Fryklund application.

The novel features of the present invention will appear from the following general outline of the operation of the lacing head. This device is controlled by sensitive electrical circuit makers, spoken of as limit switches, each arranged to operate on the approach of a mechanical part to the limit of its travel, such switches being sometimes known as microswitches and being purely conventional. These switches generally operate relays which are capable of handling heavier currents, such as those required for the operation of air valve solenoids. Again, in general, when a component part reaches a particular position, a limit switch will be operated which will thereupon trigger the next mechanical operation and this in turn will terminate in the operation of another limit switch.

The lacing head, in general, consists of (1) a needle and gripper controlled to move beneath a bundle of wires to pass a lace from the needle to the gripper and to then move above the said bundle of wires, (2) means to rotate the needle and gripper 180° about its axis to entwine the lace, (3) a means for pulling the lace tightly about the said bundle of wires, (4) a welding means for squeezing the said entwined lace between a pair of electrodes and thereupon applying a high frequency current thereto to produce a thermoplastic weld, (5) a means for cutting the lace at the point of the needle and (6) a means for rotating the needle and gripper back to the starting position ready to go through this cycle again. The lace, in the form of a circular cross section strand of thermoplastic material formed about a fiberglass core having considerable tensile strength, is threaded through a gripper which operates after the end has been entwined about the bundle of wires to pull the said entwined strand tightly about said bundle, and thence through the needle. The needle is furnished with an overrunning clutch whereby the strand is caused to extend out and beyond the point of the needle by a length sufficient to reach into the jaws of the gripper. The arm of this overrunning clutch is spring loaded, so that the extra length of the lace is not forced out of the nose of the needle until the needle has reached the end of its travel and the nose thereof is directly before the jaws of the gripper. Hence the strand, upon the first downward movement of the needle and gripper may be passed beneath the bundle of wires, the end thereof engaged by the gripper, and a sufficient length thereof may be pulled from the point of the needle as the needle and gripper rise above this bundle and then rotate to entwine the strand. Thereafter the said means for pulling the lace tenses it to tighten the loop formed about the said bundle of wires. Before this tension is relieved, the welding electrode comes down and presses on the knotted strand much as a person would place a finger on a knot until it is secured, and thereafter a high frequency current is applied to this electrode and another beneath the knot. Thereupon the tension on the strand is relieved, the strand is snipped at the point of the needle and the needle and gripper are rotated back 180° to their normal positions.

Part of the operation of the device of the present invention, but which in itself is considered to be conventional herein, is the coordinate movement of the lacing head to different locations. This may be accomplished in any convenient manner and is particularly adapted for such movement in accordance with the operations of the machine disclosed in the said Fryklund application. Thus, after a lacing operation as above described has been completed, the lacing head will be moved to another location where the bundle of wires at that point is compacted and secured by an entwined lace.

A feature of the invention is a hollow arcuate needle by means of which a lace may be threaded beneath a bundle of strands and further threaded into the jaws of a gripper, both of which may then be elevated above the said bundle so that by a rotation of the needle and gripper the lace may be entwined about the said bundle.

Another feature of the invention is the use of a gripper for thereafter tensing the lace so as to tighten the loop of lace just prior to the welding of the loop formed by the entwining rotation of the needle and gripper.

Another feature of the invention is the use of an electrode for first securely holding the knot formed in the lace and for thereafter serving to pass a high frequency current therethrough to weld the loops of the said knot together.

Another feature of the invention is the formation of the nose of the said electrode and a blade mounted thereon into a shear for snipping the lace directly after the said knot has been welded.

Other features will appear hereinafter.

The drawings consist of nine sheets having twenty-nine figures, as follows:

FIGS. 3 to 10 inclusive are a series of schematic drawings of the lacing head useful in explaining the essential steps in the lacing procedure, and in which;

*The Lacing Head*

Figures 1, 2:
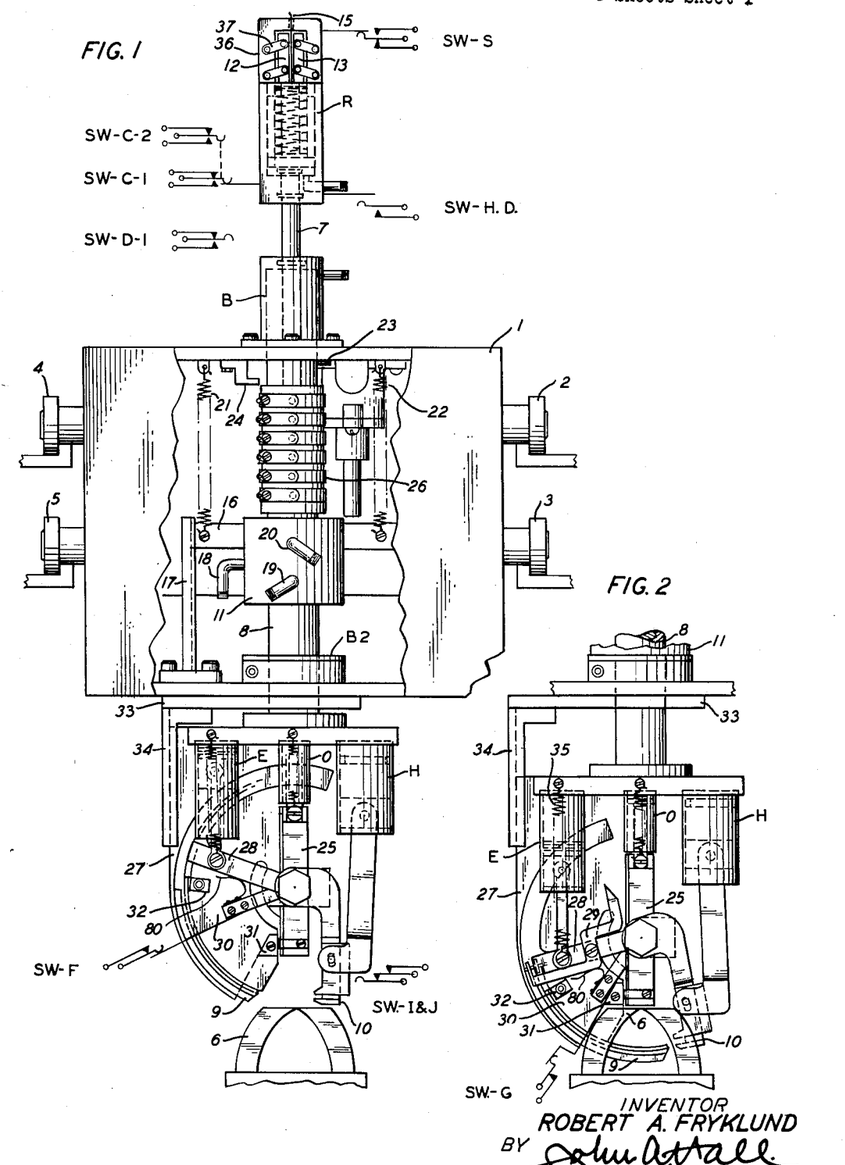
FIG. 1 is an end view looking in a direction parallel to the longitudinal direction of the rows of fingers into which the strands of a bundle may be placed and in the direction over which the lacing head may be rolled along the rails of the frame, this said figure being somewhat schematic in form and being partly broken away to show the general internal arrangement of certain of its component parts.
FIG. 2 is a fragmentary sketch of a part of the device shown in in FIG. 1, in which the needle and gripper assembly have been moved downwardly to the position in which the lace is passed beneath a bundle of strands and the end of the lace is inserted into the jaws of the gripper.

FIG. 1 is an end view of the lacing head, partly schematic in nature and partly broken away to expose to view certain of the components which would be otherwise hidden and hard to describe. The device is built about a box 1 provided with rollers 2, 3, 4 and 5, which rest on channel bars forming the frame of the machine. Since this device may be moved to and fro in a line perpendicular to the surface of this drawing and the frame including the channel bars may be moved along lines to the right or to the left of this figure, it will be seen that the device may be moved coordinately with respect to a plurality of rows of fingers or storage teeth 6 into each of which a bundle of strands has been threaded in accordance with the operations described in the said Fryklund application. The cooperative relationship between the components of the lacing head and the storage teeth depicted in FIG. 1 is that reached at the termination of a coordinate movement of the lacing head and before any of the lacing operations have taken place.

In the operation of the device, an air cylinder B pneumatically moves the main shaft 7 and 8 downwardly and another air cylinder E thereafter moves the needle 9 and gripper 10 assembly and the element 11 downwardly until the element 11 contacts the stop B2 and brings this element to a stop, whereby the needle and gripper assembly are moved to the position shown in FIG. 2. The gripper grasps the end of the strand now offered by the nose of the needle and the needle and gripper assembly move above the bundle and are rotated 180° to entwine the lace about the bundle. Thereafter the air cylinder R, housing the means for grasping the lace 15 threaded upwardly through the center of the main shaft 8 and 7, operates and, by moving the gripper jaws 12 and 13, tautens the lace 15.

The element 11 is mounted on a cross bar 16 movable downwardly in the guide channel 17 (and another similar channel not shown) so that the element 11 does not revolve with the shaft and therefore does not entangle the pneumatic tubes (not shown) attached to the nipples 18, 19 and 20, having access through the shaft 8 to the air cylinders E, O and H. The bar 16 is attached to the top of the box-like structure 1 by two springs 21 and 22 which serve to move the shaft 7 and 8, the element 11 and the needle and gripper assembly back to its normal position as shown in FIG. 1.

Attention is directed to a pin 23 fixed into the shaft 8, which, when the shaft is rotated 180°, will come into active cooperative relationship with the stop 24 so that at that time another activation of the air cylinder B can only move the needle and gripper assembly, including the welding electrode 25, downwardly far enough to gently crush the knot of the lace.

Attention is also directed to a set of slip rings, such as the sing 26, which is attached to the shaft 8, revolves with it and affords electrical connection to certain limit switches, such as the SW–F (operated when the needle is in its completely relaxed position, as in FIG. 1), the SW–G (operated when the needle is in its completely extended position), and the SW–I and J (operated when the air cylinder H is activated and the gripper is closed). In these FIGS. 1 and 2 the above noted switches are shown schematically since the showing of them as mounted on the lacing plate 27 would be unclear. The usual brushes which cooperate with the said slip rings are actually mounted on an element which is a part of the cross bar 16 so that the wiring connected thereto, flexible enough to accommodate the small up and down movement of the bar 16, nevertheless is not disturbed by the rotation of the shaft.

The air cylinder E impels the arm 28 which, together with the element 29, forms a clutch for grasping the lace near the upper end of the quadrant 30 on which the needle 9 is mounted. As this clutch is moved in a counter clockwise direction, as shown in FIGS. 1 and 2, it not only grasps the lace and pushes it toward the nose of the needle as the needle is being cammed into the position shown in FIG. 2, but it impels the quadrant 30 through a spring 80 until the quadrant 30 comes up to a stop 31. Thereupon it overruns that position until the clutch itself comes up to a stop 32 whereby an extra length of the lace is pushed out of the nose of the needle to be grasped between the jaws of the gripper 10.

It will appear hereinafter that when at a later period the welder 25 is moved downwardly, the upper end of the clutch element 29 is cammed by a projection on the welder 25 so that the jaws of this clutch open to relax the grasp on the lace.. At the same time the activation of the air cylinder E will be relaxed and so under the force of the spring 35 the clutch will be returned by the amount it had overrun the quadrant 30 and then it will release the quadrant and the needle so that more of the lace may be paid out as the main lacing plate 27 is retracted to bring the nose of the needle above the bundle of strands.

Figures 13, 14, 15, 16, 17, 18:
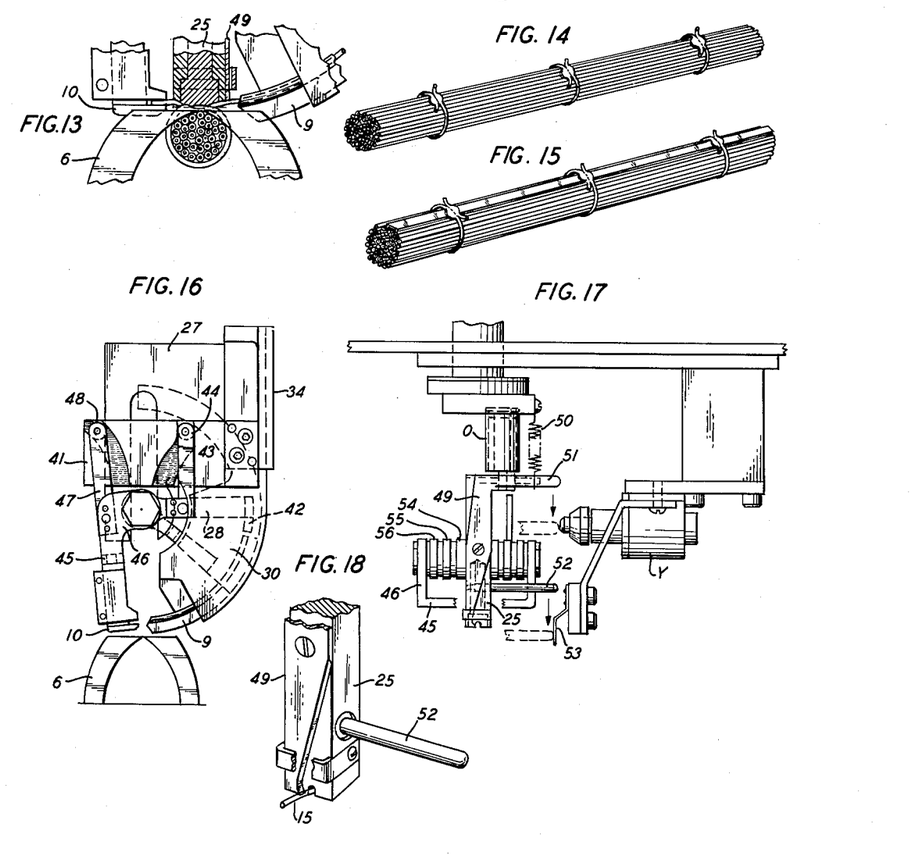
FIG. 13 is a similar view showing a lace being welded by high frequency current applied to the fingers and the grounded cooperating electrode.
FIG. 14 is a perspective view of a portion of a bundle of strands laced without a tie strip.
FIG. 15 is a similar perspective view of a portion of a bundle of strands laced with a tie strip.
FIG. 16 is a detail view of the needle and gripper assembly showing the camming arrangement whereby the needle and gripper are moved toward one another both when they have been moved under the bundle of strands and later when they have been moved above said bundle and the needle and gripper assembly has been rotated 180° to entwine the ends of the lace.
FIG. 17 is a detail view indicating how the electrode may be moved downwardly to compact the knot and how in this position an arm of the lace cutter blade is moved into cooperative relationship with an air cylinder which moves the said cutter blade to snip the lace on the last step of the lacing operation.
FIG. 18 is an enlarged perspective view of a portion of the electrode indicating a recess in the bottom thereof to contain the lace and to show the cooperative relationship of the cutter blade, this figure also showing an electrode which, as indicated in FIG. 17, has made contact with a spring leading from a source of welding current.

Now it should be noted that the plate 33 carrying the main lacing plate guide 34 is rotatable whereby the needle and gripper assembly may be rotated 180° to a position as indicated in FIG. 16.

The air cylinder R is attached to the upper end of the shaft 7. It is provided with a spring returned piston and operates on the admission of compressed air thereto to raise upwardly the element 36 to which the gripper jaws 12 and 13 are attached by toggle bars, such as 37, so that as this element 36 moves upwardly, the jaws 12 and 13 move downwardly and inwardly to firmly grip the lace and tauten it, thus drawing the lace tightly about the bundle of strands.

Certain sets of contacts are shown schematically in association with the air cylinder R. Those marked SW–C1 and SW–C2 will be operated as shown when the device is in the position of FIG. 1, and those marked SW–D1 will be operated when the device is in the position of FIG. 2. Those marked SW–5 and SW–HD will be operated when the shafts 7 and 8 have been rotated 180° and the shaft has been lowered until stopped by the contact between the pin 23 and the stop 24. Other movement of parts will be specifically described hereinafter.

*The Sequence of Operations*

Figure 3:
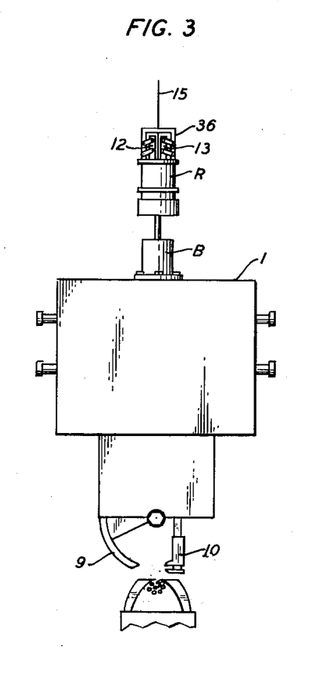
FIG. 3 is a schematic showing of the lacing head as it is positioned in cooperative relationship with a particular set of fingers ready for entwining a loop of the lace about a bundle of strands.

The sequence of the operations in lacing a bundle of strands is shown schematically in the following eight drawings, FIG. 3 to FIG. 10 inclusive. FIG. 3 shows the device in normal position, where it has been moved to a location where the lacing operation is to be performed. The needle 9 and the gripper 10 hover over the line of the bundle of strands held within a low row of fingers 6.

Figure 4:
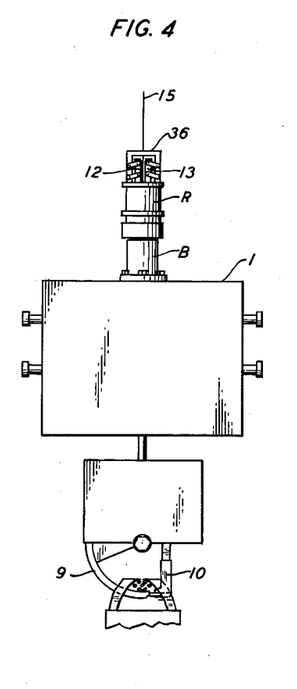
FIG. 4 is a similar view showing the first downward movement of the needle and gripper to the point where the needle has passed the end of the lace beneath the bundle of strands and into the jaws of the gripper.

FIG. 4 shows the first movement resulting from the admission of compressed air to the air cylinder B. The needle and gripper have been cammed into a position where both have entered the array of fingers, air cylinder E has been operated and the nose of the needle is moved into position before the jaws of the gripper and the overrunning clutch associated with the needle has pushed the end of the lace into the jaws of the gripper. This is followed, before the movement depicted in FIG. 5 has been made by the closing of the jaws of the gripper whereby the end of the lace is firmly held throughout the following operations.

Figure 5:
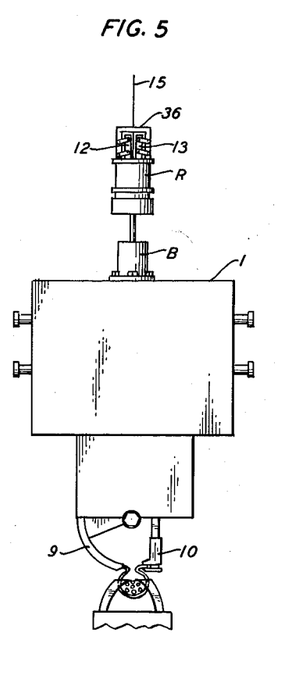
FIG. 5 is a similar view showing how the needle and gripper have been elevated to their first position so as to virtually encircle the bundle of strands with the lace leading from the nose of the needle.

FIG. 5 shows the return of the needle and gripper to the position of FIG. 3 but with the lace issuing from the nose of the gripper, the lace substantially encircling a bundle of strands and the end of the lace being firmly gripped by the gripper.

Figure 6:
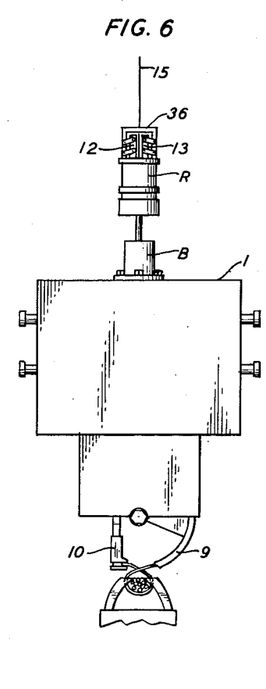
FIG. 6 is a similar view showing how the needle and gripper assembly has been rotated 180° so as to entwine the ends of the loop of the lace.
Figure 7:
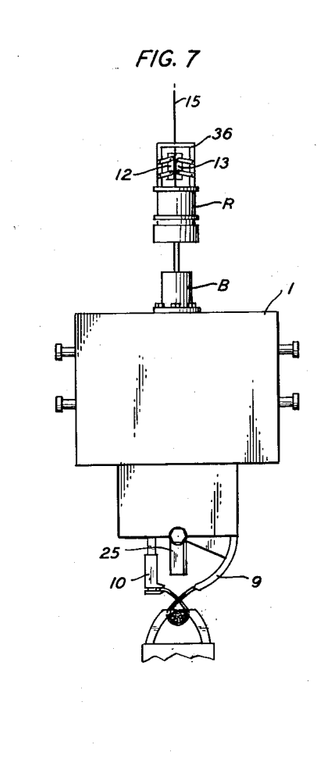
FIG. 7 is a similar view showing how the gripper at the top end of the main shaft has been moved upwardly, pneumatically, to grip the lace and to tauten it to compact the bundle of strands.

FIG. 6 is a similar view but in which the lacing mechanism has been rotated on its axis 180° so that the end of the lace and that portion issuing from the nose of the needle have been entwined. It may be noted that the air valve R rotates with the shaft and hence the views of the wire gripper 36 should be different in FIGS. 6 to 10 than as they are shown in FIGS. 3 to 5 but for ease of understanding they have all been shown alike since those in FIGS. 3 to 5 are shown properly whereas those in FIGS. 6 to 10 are in some respects the center of attraction.

In FIG. 6 it will be seen that the gripper frame 36 has been moved upwardly so that the two jaws 12 and 13 have taken a firm grip on the lace 15 and the loop about the bundle of strands has been tightened.

Figure 8:
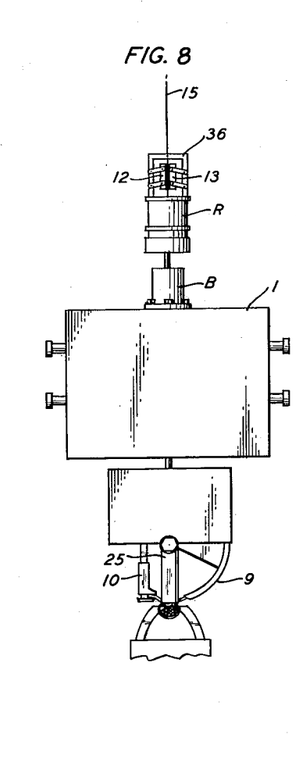
FIG. 8 is a similar view showing the fingering of the knot by the electrode while the high frequency welding current is being applied to the electrode to the ground provided by the fingers.

In FIG. 8 the strain on the lace is still maintained while the electrode 25 moves down to squeeze the knot while the high frequency current is applied therethrough to make a weld. The shaft is in the "half down" position (limited by the stop 24).

Figure 9:
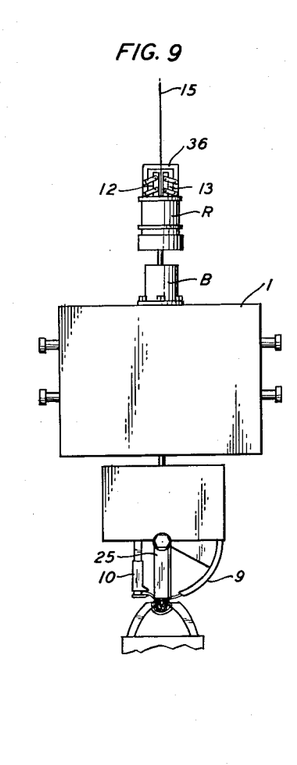
FIG. 9 is a similar view showing the relaxing of the strain on the lace after the knot has been welded.

In FIG. 9 the gripper 36 at the top of the shaft has relaxed so that the strain on the lace has been relaxed. The electrode 25 is still holding the now welded knot.

Figure 10:
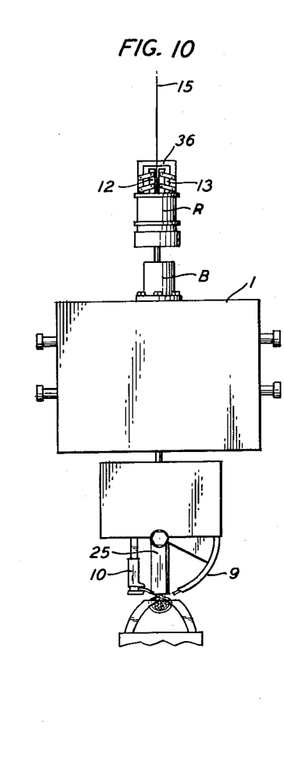
FIG. 10 is a similar view showing the snipping of the lace at the nose of the needle after the strain on the lace has been relieved.

In FIG. 10 the lace has been snipped at the nose of the needle. This ends the lacing cycle. Thereupon the electrode will be retracted, the end of the lace in the gripper 10 will be cut and released, the needle and gripper assembly will be moved upwardly to its normal position and the assembly will be rotated back 180° to the position shown in FIG. 3.

*Details of Construction and Operation*

Figure 11:
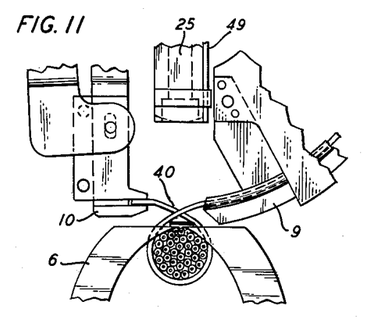
FIG. 11 is an enlarged fragmentary side view of the needle and gripper, a bundle of strands contained within a row of fingers, showing the lace entwined thereabouts and featuring the use of a tie strip.
Figure 12:
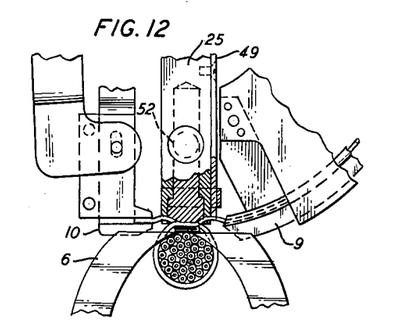
FIG. 12 is a similar view showing how the electrode has been moved down to compact the entwined ends of the lace and the plastic of the tie strip to produce a lacing similar to the conventional lacing produced by hand.

FIG. 11 shows an enlarged detail view of a lacing operation just after the lacing head needle and gripper assembly has been rotated and just before the electrode 25 has been lowered to compact the knot formed by the entwined end of the lace. This shows the use of a tie strip 40 consisting of a ribbon of plastic material such as that of which the lace is formed. This ties the various loops together as illustrated in FIG. 15 so that none of the lacing loops may slip. FIG. 12 is a similar view showing how the electrode 25 has compacted the knot.

FIG. 13 is a similar view showing the arrangement where the knot formed by the entwined ends of the lace is compacted between the electrode and the upper tips of the fingers 6 and which will produce a laced harness bundle of strands such as that shown in FIG. 14.

FIG. 16 is a showing of the camming member 41 attached to the guide 34 which remains stationary when the needle and gripper is moved downwardly as indicated in FIG. 2. As shown in FIG. 16, the needle 9 is supported on the quadrant 30 which is driven by the spring 80 through part 28 (which has a movement limited by stop 31 with respect to the quadrant 30 indicated by the elongated slot 42). This part 28 is attached to an arm 43 having mounted thereon a cam follower 44. In practice, the assembly plate 27 is moved downwardly until the cam follower 44 escapes from the camming surface in the plate 41. During this movement the nose of the needle moves outwardly and away from the fingers 6 but when the cam follower escapes, the needle, impelled by cylinder E, moves swiftly into the position shown in FIG. 2. The overrunning clutch formed of the parts 28 and 29 in their counter clockwise movement (FIG. 2), grasps the lace at the end of its upward movement and in its clockwise movement (FIG. 16), after the escape of the follower 44 continuing smoewhat beyond the stoppage of the quadrant 30 by the stop 31, until the end of the slot 42 in the quadrant 30 is reached, thus giving an extra length of lace beyond the nose of the needle which may be grasped by the gripper 10. In the return movement controlled by the spring 35, the cam follower will be moved in a counter clockwise direction (FIG. 16) until it finds the entrance to the camming slot in the plate 41. Thus, when the positions of FIGS. 5 and 6 have been reached, the nose of the needle and the jaws of the gripper approach each other closely and directly above the openings between the fingers 6. Shortly thereafter and when the main shaft has been forced down until the stop 24 is contacted, due to the shape of the camming tracks in the element 41, the nose of the needle and the gripper are moved apart to give room for the descent of the electrode.

The gripper is mounted on a U shaped bar 45, having an ear 46 at each end thereof by which this bar is mounted on the pivot shafts which straddle the electrode 25. The U shaped bar 45 is a yoke and the body of the gripper 10 is fixed thereto at its centerpoint, not shown in FIG. 17 where it would obscure the electrode. At one side thereof an arm 47 is attached, carrying a cam follower 48. Thus the gripper 10 may be cammed to cooperate wtih the needle.

FIG. 17 is a fragmentary showing to explain the construction and arrangement of the electrode 25 and the cutter blade 49 mounted thereon. The electrode 25 is moved downwardly by the air cylinder O and is retrieved by the spring 50. The cutter blade 49 has a side arm 51 which, upon the full downward movement of the electrode 25, comes (as shown in dotted lines) into cooperative relationship with the plunger of the air cylinder Y. It is believed to be clear from FIG. 18, how the cutter blade 49 in cooperation with the small niche in the bottom of the electrode, acts as a shear to snip the lace 15.

The electrode 25 also has extending from the side thereof, a bar 52 acting as a connector which also comes into contact with a spring 53 thus affording an electrical connection to the generator of the welding current employed for welding the compacted knot.

It may be noted, in FIG. 17, that the main plate 27 provides the pivot supports 54 for the pivots on which are mounted the yoke pivots 55, the overrunning clutch yoke pivots 56 and the gripper yoke pivots 46, as above described.

Figures 19, 20, 21, 22, 23:
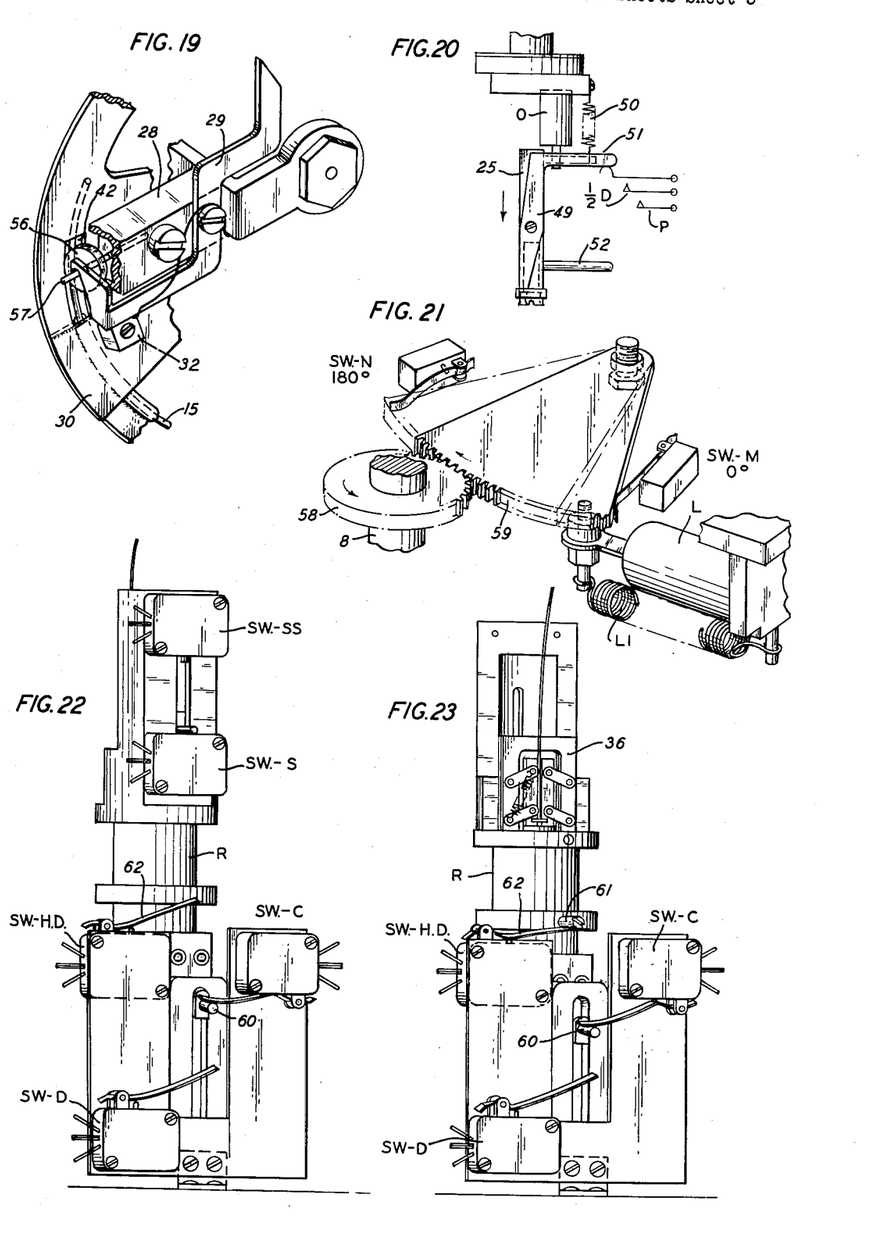
FIG. 19 is a perspective view of certain details of the overrunning clutch by which the lace is grasped on the first downward movement of the needle and gripper assembly and made to extend out of the nose of the needle and into the jaws of the gripper.
FIG. 20 is a schematic showing of a pair of switches operated in sequence by the downward movement of the electrode to first cause the gripper atop the main shaft to grip the lace to tauten the knot and when the knot has been compacted by the electrode to transmit the high frequency welding current therethrough.
FIG. 21 is a detail view of the gearing used to rotate the needle and gripper assembly 180° to entwine the ends of the lace and showing the air cylinder used to cause this movement, the spring used to return the parts to normal and the limit switches used to signal the completion of these movements.
FIG. 22 is a perspective view showing the location of certain limit switches operated by the up and down movement of the main shaft and the up and down movement of the gripper assembly atop the main shaft.
FIG. 23 is a similar view showing the switches operated when the main shaft has been rotated 180° to entwine the ends of the lace.

FIG. 19 shows some details of the overrunning clutch used to advance the lace 15 as the needle is given its last counter clockwise movement (FIG. 4) over the pressure of spring 80. The clutch is fashioned from a wheel 56 supported on an axle 57 loosely supported in the end of the arm 28. The end of the member 29 is bent over and provides a camming surface so that as the parts 28 and 29 together move in a counter clockwise direction, the wheel 56 will be cammed downwardly to squeeze the lace 15 firmly between the wheel 56 and the base plate 30 on which the needle is mounted so that as the needle 9 is driven forward the lace 15 likewise will be driven forward. When the stop 31 is encountered the clutch, due to the aperture 42 in the needle base plate 30, will continue its movement to project the lace a short distance out of the nose of the needle 9 and into the jaws of the gripper 10.

When the grip on the lace is to be relaxed, the member 29 is cammed in a counter clockwise movement whereby the wheel 56 is loosened as the member 29 returns to its normal position. As the needle moves backward to its normal position, the overrunning clutch is released and the lace is freed.

FIG. 20 is a schematic showing of switching means controlled by the electrode 25. When the air cylinder O is operated, the electrode 25 is moved downwardly and the portion 51 of the cutter blade 49 operates two contacts sequentially, those marked ½D and P. In actual operation, contact is first made to the ½D (one half down) and results, as will be explained shortly, first in the operation of the control relay Q which thereupon causes the energization of the air cylinder R to cause the upward movement of the member 36 whereby the jaws 12 and 13 grip the lace 15 and pull it upwardly to tighten the knot and thereafter as the electrode 25 has firmly pressed the knot of the entwined lace ends to close the circuit through the switch member P. The last circuit closure will appear hereinafter to cause the operation of a control relay U which closes a circuit for the welding generator whereby the high frequency current is then conducted to the contact maker 52 so that the pressed knot is welded together as heretofore explained in connection with FIGS. 12 to 15.

FIG. 21 is a schematic showing of the means used to revolve the main shaft 8 180°. The main shaft 8 has fixed thereto a gear 58 meshing with a gear segment 59. Under properly controlled conditions it will appear hereinafter that as the main shaft returns upwardly as indicated in FIG. 5, a control relay K will be operated and this will cause the air cylinder L to be operated whereby the main shaft is rotated 180°. The segment 59 in its normal position operates a limit switch M and in its fully operated position operates a limit switch N. The segment 59 is returned from its operated position to its normal position by means of the spring L1 when the air valve cuts off the supply of pneumatic pressure to the air cylinder L.

FIGS. 22 and 23 are perspective views of the top portion of the device showing particularly how certain of the limit switches are operated. In these figures, a pin 60 which is attached to the main shaft is shown as capable of up and down movement in accordance with the movement of this main shaft. When the shaft is up in its normal position, as indicated in FIG. 3, then the pin 60 rests against the finger of the limit switch C and when the shaft is down, as indicated in FIG. 4, then the switch D will be operated. These switches C and D are shown schematically in FIG. 1 and will be referred to in the following description of the wiring diagram.

In the same manner, the switch S is operated in the normal position of the frame 36 to close the circuit of the air valve Y only when the tension on the lace 15 has been relaxed. The upper switch SS is a safety means used when the frame 36 has reached the upper limit of its movement.

The switch HD shown as not operated in FIG. 22 and as operated in FIG. 23, is controlled by a pin 61 which comes into cooperative relationship with the finger 62 only when the main shaft has been rotated 180° as indicated in FIG. 23. Also as indicated in FIG. 23, the switch HD is not operated until the main shaft has been lowered, as indicated in FIGS. 8, 9 and 10, until stopped by the pin 23 and the stop 24.

*The Wiring Diagram*

Figures 24, 26, 27:
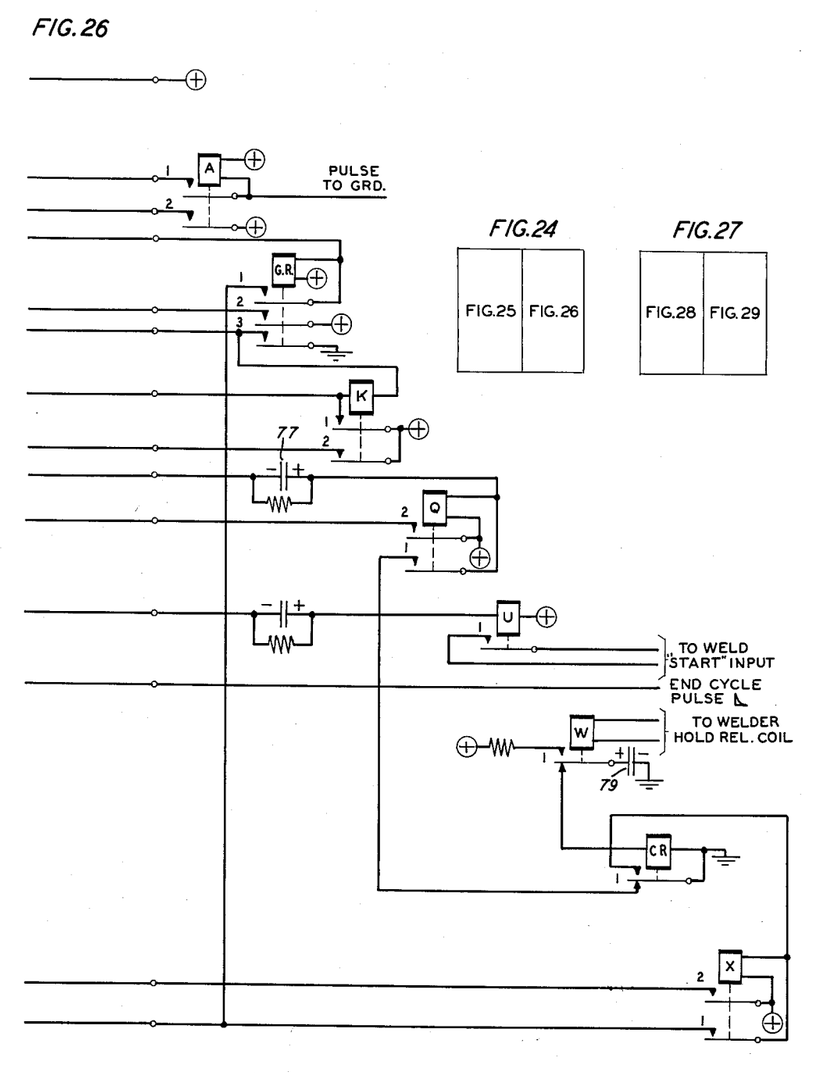
FIG. 24, on the same sheet with FIG. 26, is a block diagram showing how the sheets containing FIGS. 25 and 26 may be placed to constitute a wiring diagram for the automatic control of the device of the present invention.
FIGS. 25 and 26, taken together, constitute a schematic circuit diagram showing the cooperative relationship between the control relays which may be mounted in a control cabinet and the air valve solenoids for controlling the pneumatic cylinders mounted on the device as well as the limit switches tripped by the various components of the device at the limits of their movements.
FIG. 27, on the same sheet with FIG. 26, is a block diagram showing how the sheets containing FIGS. 28 and 29 may be placed to constitute a sequence chart showing the automatic sequential operation of the elements of the present invention.
Figure 25:
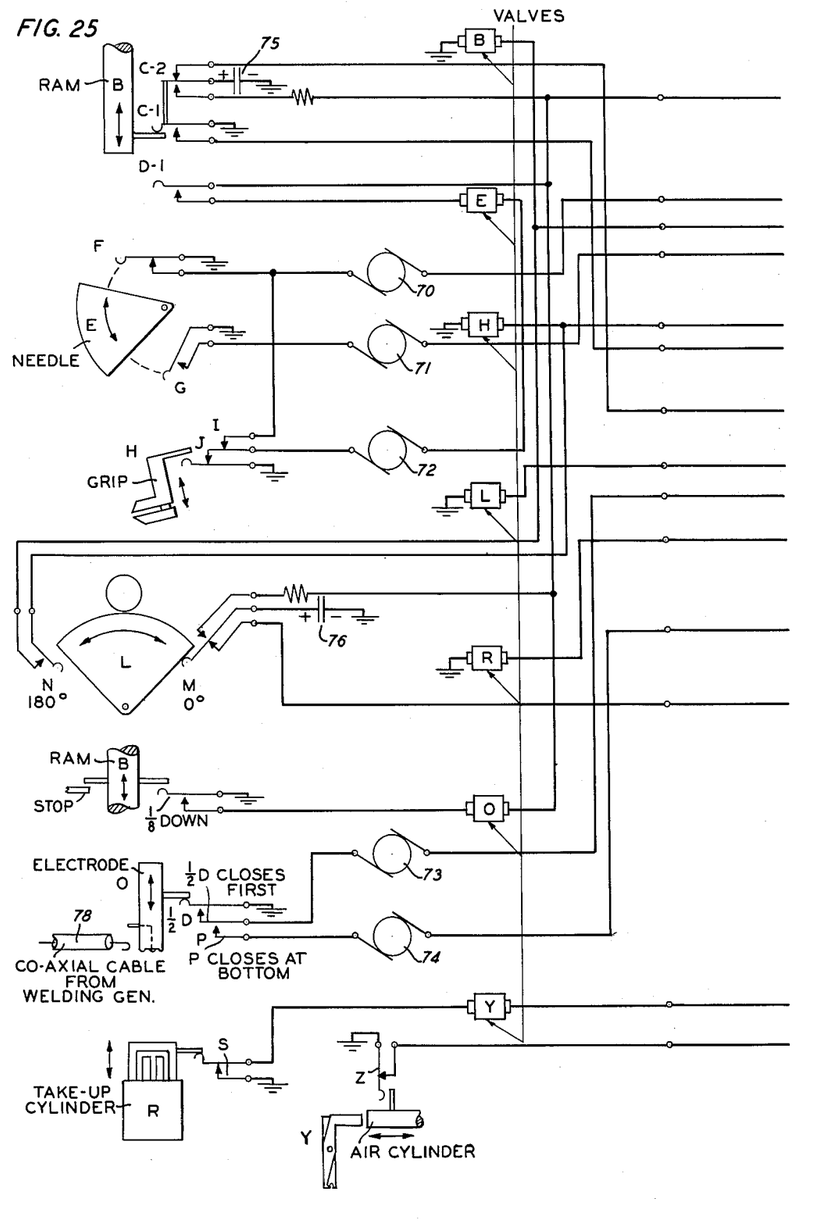

FIGS. 25 and 26, arranged as indicated in FIG. 24, provide a schematic wiring diagram from which the sequence of operations may be traced. The wiring actually consists of three main parts, that part consisting mostly of the control relays which may be mounted on a control panel and which also serves for the circuitry to move the lacing head to different locations in accordance with coded instructions, that part which consists essentially of a flexible cable containing wires and at least one pneumatic tube to supply a source of compressed air to the various valves which in turn supply compressed air to the various air cylinders and that part consisting of the wiring between the limit switches and the control relays by which the control relays are operated as the various component parts of the device mechanically complete their movements. Since some of these limit switches are mounted on elements which revolve, a set of slip rings 70 to 74 is provided to maintain proper connections during the mechanical rotary movement of the parts.

The automatic operation of the lacing head after it has been properly positioned at a given place along the cable harness, is started by a momentary pulse (marked pulse to ground in FIG. 26) which causes the control relay A to operate. Since the needle segment E in its normal unoperated position holds the needle top switch F open, a ground at this time will be traced through the switches J and I (opened only when the jaws of the gripper are closed) through the slip ring 70, to the front contact of armature 1 of the relay A, whereby this relay is locked into operated position.

Relay A, through its armature and front contact 2, closes a circuit to energize valve B which supplies air pressure to the air valve B, spoken of as the ram. This causes the main shaft to move downwardly as indicated in FIG. 4. The needle and gripper follow a predetermined path restricted by independent camming surfaces as indicated in FIG. 16. Both the needle and gripper pivot about the yoke, which is permanently attached to the main plate. The main plate is rigidly attached to the main lacing plate and the top of this shaft forms the piston of air cylinder B. In addition, the main lacing plate is guided by the lacing plate guide on its downward travel; this guide does not move in the vertical plane but is free to rotate in the horizontal plane. At this time the needle and gripper are ready to move to the position indicated in FIG. 4.

Upon the downward movement of the shaft the switches C–1 and C–2 are operated and at the end of the downward movement the switch D–1 is closed. Switch C–1 closes ground to the winging of the K relay but this relay does not operate at this time. Switch C–2 places a condenser 75 in a charging circuit so that when at a later time the air cylinder returns to normal, a circuit for the discharge of this condenser will be transiently closed through C-1 and C-2 to pulse the relay K. When the ram B completes its downward travel, the limit switch D-1 will close a circuit through the valve E, the slip ring 72 and the switch J to ground. The operation of valve E will impel the needle to the position under the bundle of strands with its nose close to the jaws of the gripper. As the air cylinder E is driven, it comes to a stop by contacting the stop 31, whereupon the switch G is closed. At this time the needle stops but the overrunning clutch continues to drive until it contacts the stop 32. During this overtravel when the needle was stopped and the overrunning clutch was locked, about a quarter of an inch of lace was forced out of the needle between the jaws of the gripper. The camming surface of the needle is such that the needle cannot be forced under the cable unless the head is at the end of its downward stroke.

The closure of the limit switch G completes a circuit through the slip ring 71 to the control relay GR which then locks to the ground supplied by the limit switch Z (which will not release until the lace has been shipped). The GR relay causes the energization of the valve H which in turn admits air to the air cylinder H, thus causing the gripper to close on the end of the lace and this grip will be maintained until the lace is snipped at the nose of the needle.

The closing of the gripper opens the limit switch J thus releasing the driving bar air cylinder E, whereupon the needle retracts and moves out from under the cable. When the needle becomes retracted the switch F is opened whereupon the control relay A is released and the valve B is deenergized.

Air cylinder B deenergizes and the lacing mechanism returns to full up position. The path of the needle and gripper are again restricted by the cams, as illustrated in FIG. 16. The lacing cord is under the cable and the gripper and needle are above the teeth.

As the ram B reaches its full up position, the charged condenser 75 is discharged through the C-1 switch (which closes before the C-2 springs open) to pulse the control relay K. Relay K locks through the limit switch C-1. Relay K closes a circuit for the air valve L whereby the gear segment is moved to rotate the lacing head 180° putting the condenser 76 into a charging circuit and lastly closing the switch N. This again operates the air valve H but since the needle and gripper have been rotated, they are limited in their downward travel by the stop 24. Thereupon the ⅛ Down switch is operated and the air valve O is energized to admit air to the O cylinder which operates to move the electrode downwardly.

On this downward movement of the electrode O, the ½ D switch first closes and extends a ground through slip ring 73 through condenser 77 and the winding of the Q relay to battery. The charging current of the condenser 77 pulses the Q relay and this locks to a back contact of the CR relay. The Q relay extends battery to the air valve R which then operates the take-up cylinder R which energizes the moving linkage whereby the bars 12 and 13 move upward and inward. The lacing cord is thus gripped and tensioned whereby the loop about the bundle of strands is tightened.

Air cylinder O forces the welder electrode downward until it contacts the lacing cord whereupon a dielectric weld is formed. The P switch is closed in this position and the U control relay is pulsed. This closes a circuit to a conventional welding generator which thereupon transmits a welding current over the coaxial cable 78.

The welder causes a momentary operation of the control relay W which thereupon charges the condenser 79 so that as the relay W releases, it pulses the relay CR thus releasing the relay Q and therefore the air valve R.

The air cylinder R then releases, relieving the tension on the lace and returns to normal under spring power.

The pulsing of the control relay CR pulses the X relay which locks through the switch Z. The relay X closes a circuit through the switch S as the take up cylinder comes back to normal whereby the Y air cylinder moves its plunger to strike the cutter bar to snip the lace at the nose of the needle and to momentarily operate the switch Z. Air cylinder Y is then released.

The momentary operation of switch Z releases the control relay GR whereupon the gripper air cylinder H is deenergized and it returns to its initial position under spring power.

The needle returning to its initial position, operates the switch F to release the relay A whereby the air cylinder B is deenergized and the device returns to its full up position. The momentary operation of the switch Z releases the relay GR and this is followed by the release of the air valve L whereby the gear sector L returns to normal and operating the switch M transmits the end cycle pulse which may be used to initiate another coordinate movement of the lacing head to carry out another operation such as that just described.

*The Sequence Chart*

Figure 28:
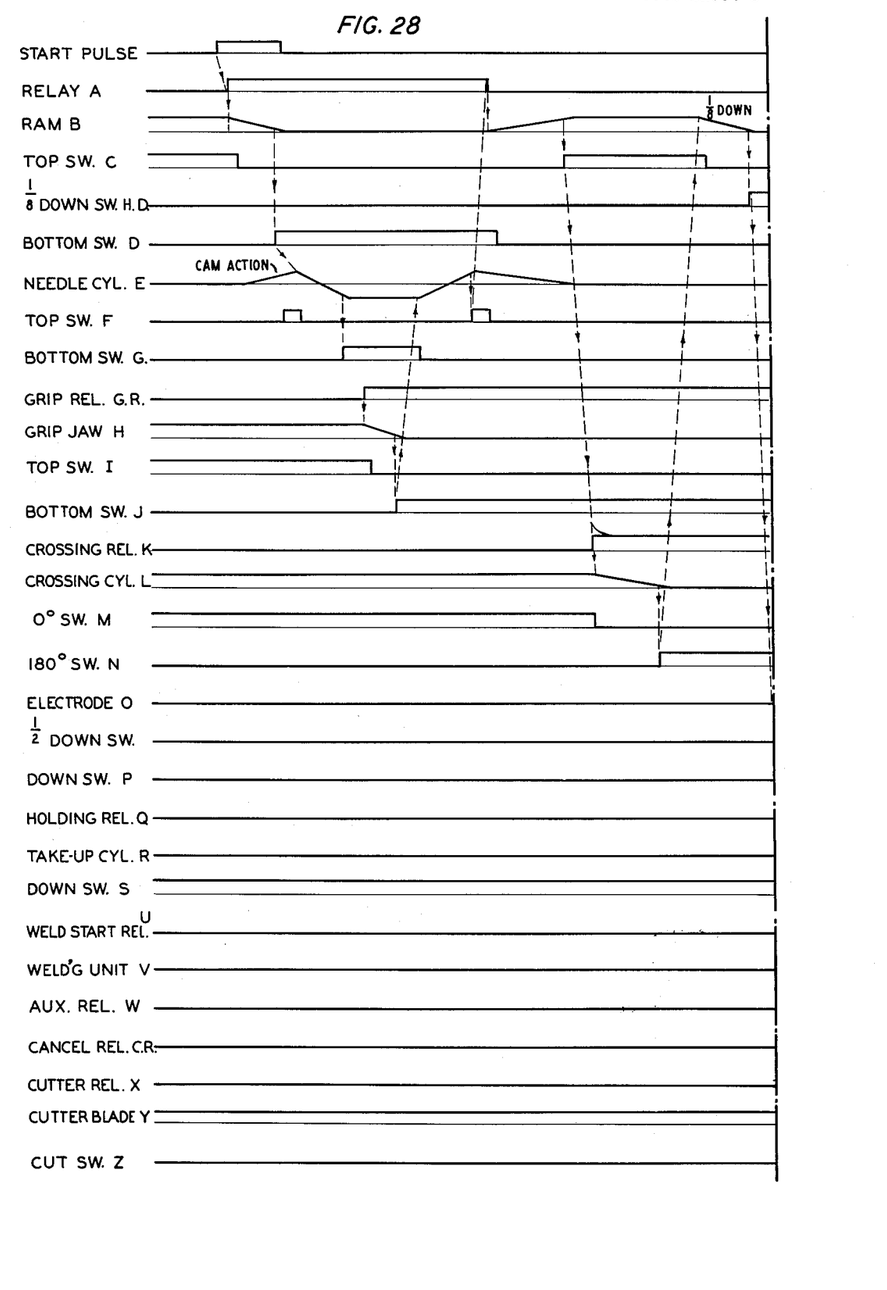
FIGS. 28 and 29 taken together provide such a chart showing the complete sequence of operations, including the operation of the limit switches, the operation of the various control relays, the operation of the various air valve solenoids and the mechanical movements of the components of the device moved thereby.
Figure 29:
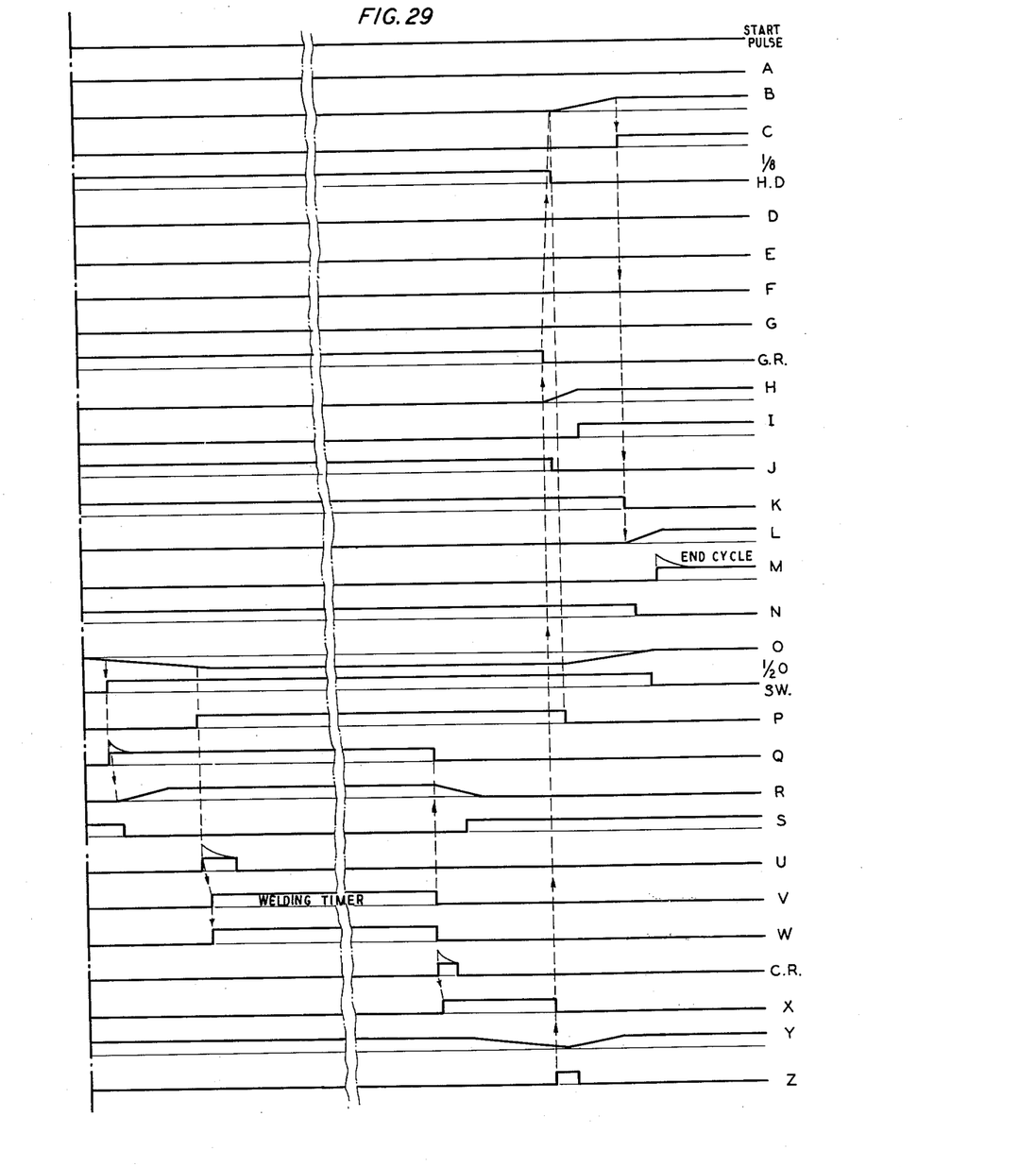

FIGS. 28 and 29, placed as indicated in FIG. 27, constitute a sequence chart for following the timing of the operations just described in connection with the wiring diagram. It will be noted that oblique dotted lines provided with directional arrow heads are used to indicate the consequential following operations flowing from a given operation and the time involved between the beginning and the ending of such a line is that required for the start of such a following operation. By way of example, there is a short dotted line from the beginning of the start pulse to the beginning of the operation of relay A so that the difference in time between these two events is thus indicated. In actuality, the start pulse is immediately applied to the realy A, but a certain (operating) time is required to effectively close the contacts thereof. Again the limit switch D is indicated as having been responsive to the downward movement of the ram B, not at the complete limit of such movement but near the end of such movement. This is to indicate the tolerance necessary for the certain and reliable operation of such a limit switch, for it is well understood that these limit switches must have a certain tolerance in operation. These dotted directional lines are therefore supplied for a visual appreciation of the consequences of certain operations. With this understanding, therefore, the sequential operation of the lacing head may be described in the following separate steps.

(1) The lacing head receives a start pulse in any conventional manner, such as a pulse from data read out of a punched card in a controller.

(2) The start pulse results in the operation of relay A, which thereupon closes a locking circuit for itself through top swtich F.

(3) Relay A closes a circuit ot energize the air valve B to start the downward movement of the piston in air cylinder B, spoken of also as the ram B.

(4) When the ram leaves its top position, it causes switches C-1 and C-2 to operate whereby C-1 places ground in the circuit of relay K and C-2 places the condenser on its swinger in a charging circuit.

(5) When the ram B reaches its full down position, the switch D-1 is closed, thus energizing the needle air valve E.

(6) The needle therefore moves across (under the bundle of strands to be tied together) thus closing switch F at the start of this movement and switch G at the end thereof. The air valve B is maintained in operation by switch F and switch I.

(7) When switch G is closed, it causes the GR relay to become operated. The GR relay closes a locking circuit for itself through the normally closed cut switch Z.

(8) The GR relay energizes the grip air valve H which supplies pneumatic pressure to the air cylinder H.

(9) The jaws of the gripper close, thus opening the switches I and J.

(10) Switch I, opening, opens the holding circuit for the A relay leaving this relay now held under the sole control of switch F.

(11) Switch J, opening, causes the deenergization of the air valve E whereby the needle is caused to return to its normal position.

(12) Switch F is opened as the needle attains its normal position and thus relay A is released.

(13) Upon the release of relay A, the air valve B is deenergized and the ram B returns to its normal full up position.

(14) At its top position again, the switch D is released and the switch C is operated whereby the relay K is pulsed by switch C and then locked through its own contacts.

(15) Relay K causes air valve L to operate whereby the air cylinder L is operated to begin the rotation of the lacing head.

(16) As soon as the lacing head leaves its 0° position, the switch M is released and therefore a condenser controlled thereby is placed in a charging circuit.

(17) When the lacing head has completed its full 180° rotation, the limit switch N is operated whereby the connection for holding the gripper air valve operated is extended to the air valve B so that the air cylinder B (the ram) is again moved downwardly.

(18) However, since the lacing head has been rotated 180°, a stop 24 limits the movement to a ⅛ down position. This closes the HD switch.

(19) The switch HD completes the circuit to the electrode valve O, thus starting the electrode on its downward movement.

(20) Half way down, the electrode closes the ½ down switch, thus causing the operation of relay Q which now locks under the control of the CR (cancel relay).

(21) The Q relay closes a circuit for the take-up air valve R, which in turn causes the take-up mechanism to move upwardly. Providing the lace is properly caught in the gripper jaws, the cycle will continue. If the lace is not caught or is broken, the take-up cylinder R will go to the top extreme of its travel, operating the safety switch and halting the electrode and terminating the cycle.

(22) As the take-up valve R is energized, the take-up cylinder R moves up off the switch S. This removes the ground from the cutter valve Y so the cutter blade cannot operate before the tension on the lace is relaxed.

(23) When the electrode reaches its full down position the down switch D is operated which sends a capacitor pulse to momentarily pulse the relay Y. The capacitor resistance network in series with the relay U prevents more than a transient operation thereof.

(24) Relay Y in its transient operation causes a transient operation of the welder contacts whereby the welder is triggered into operation.

(25) As soon as the welder circuit is complete, relay W is operated by the welder.

(26) When the W relay operates, it places a 100 MF capacitor in a charging circuit.

(27) Steps 25 and 26 will be maintained by timing means within the conventional welding circuit.

(28) At the end of this time the relay W is deenergized but its contacts remain closed due to a pneumatic time delay device built into the relay, capable of delaying the release of the relay over a range from 1 to 60 seconds. The delay is necessary to allow the palstic material to harden after the weld and before the lace is cut.

(29) When the delay time is completed the W relay releases and connects the now charged capacitor to the CR relay for the purpose of pulsing this relay.

(30) Relay CR in its momentary operation opens the holding circuit for the Q relay and this relay releases the take-up valve R.

(31) The take-up cylinder returns to normal and operating switch S whereby the cutter valve Y circuit is prepared.

(32) Relay CR also pulses relay X for the operation of the valve Y.

(33) Relay X holds through the switch Z until this is opened as the lace is being cut.

(34) Relay X closes a circuit to operate the air valve Y, thus operating the air cylinder Y and causing the lace to be cut.

(35) As the cutter blade is contacted by the air cylinder Y, the cut switch Z is operated thus opening the holding circuits for the relay X and the relay GR.

(36) Relay X releases.

(37) Relay GR, by releasing, opens the circuit for the grip air valve H whereupon the gripper relaxes its hold on the end of the lace.

(38) Relay GR also opens the circuit through the switch N to the air valve B, thus allowing the ram to return to its full up position.

(39) When the ram returns up, the ⅛ down switch (HD) releases, thus opening the circuit of the air valve O whereby the air cylinder O is relieved and the electrode is raised by spring power.

(40) When the ram reaches its full up position, the C switch is operated and relay K is released.

(41) Relay K opens its holding circuit and causes the deenergization of air valve L, whereby the air cylinder L is released and the gear sector is returned to its 0° position under spring power.

(42) As soon as the air valve L relaxes, the head returns to its 0° position whereupon the switch M is operated and the switch M is released, thus returning the device to a position ready for reoperation over another cycle.

(43) The operation of switch M transfers the capacitor from its charging circuit to its transmitting circuit whereby an end of cycle pulse is transmitted to any desired point, such, for instance, to a control circuit which will initiate a movement of the lacing head to another co-ordinate point.

What is claimed is:

1. In a machine for lacing a plurality of strands in a compact bundle, a needle device having a channel for holding a lace extending along the longitudinal axis thereof, a lace threaded through said needle and protruding from the nose thereof, means for moving said needle to straddle a bundle of strands for moving the end of said lace beneath said bundle, means for forcing the end of said lace out of and beyond the nose of said needle, a gripper for seizing and firmly grasping the said end of said lace, means for moving said needle and said gripper to a point above said bundle, to wrap said lace in a loop about said bundle, means for rotating said needle and said gripper on an axis perpendicular to the longitudinal axis of said bundle of strands to entwine the end of said lace gripped by said gripper with the lace protruding from the nose of said needle and means for thereafter severing said lace at the nose of said needle.

2. In a machine as claimed in claim 1, means for exerting a longitudinal strain on said lace to tauten said loop about said bundle of strands and to compact said bundle of strands.

3. In a machine as claimed in claim 1, means for permanently securing said entwined ends of said lace.

4. In a machine as claimed in claim 1, a lace consisting of thermoplastic material, and means for permanently securing the entwined ends of said lace consisting of heating means for welding said entwined ends together.

5. In a machine as claimed in the next preceding claim in which said heating means consists of electrical discharge means for directing a current discharge through and about the knot of thermoplastic material comprising the said entwined ends of said lace.

6. In a machine as claimed in the next preceding claim in which said heating means includes an electrode and means is provided to move the end of said electrode into firm contact with the said knot formed by the entwined ends of said lace to prevent slippage of said tautened loop of said lace until said knot has been welded together.

7. A machine as claimed in claim 1, in which said needle is shaped in the arc of a circle and mounted on a base shaped as the segment of a circle and pivoted for rotary movement.

8. A machine as claimed in claim 1, in which said needle is mounted on a base shaped as the sector of a circle and pivoted for rotary movement and in which said means for forcing the end of said lace out of and beyond the nose of said needle comprises a clutch pivoted for rotary movement along the said needle base, and base having means to limit the rotary movement of said clutch.

9. A machine as claimed in the next preceding claim having a cam located at the movable end of said clutch for tightening a clutch element upon the movement in one direction thereof and for loosening a said clutch element upon movement in the opposite direction thereof.

10. A machine as claimed in claim 1, in which said needle is arcuate and is mounted on the arcuate periphery of a sector shaped base element pivoted at the center point thereof and in which said means for moving said needle consists of cam elements for controlling the rotary movement of said needle and means to move said pivoted center point along a vertical rectilinear path for giving the point of said needle a compound movement.

11. An automatic cable lacing machine comprising a lacing head movable along two coordinate directions to a plurality of predetermined points along the lengths of a cable harness laid out in bundles of strands, a control station including a plurality of control relays and program control means, and a flexible cable of wires and pneumatic tubes extending from said control station to said lacing head for allowing the said two coordinate directional movement of said lacing head, said lacing head comprising an assembly of mechanical elements, pneumatic means for moving said elements, air valves controlled by said control relays for admitting air pressure to said pneumatic means and limit switches operated by the approach of each said mechanical element to the limit of its movement for controlling said control relays, said mechanical elements including a needle device having a channel for holding a lace extending along the longitudinal axis thereof, a lace threaded through said needle and protruding from the nose thereof, means for moving the end of said lace beneath said bundle, means for forcing the end of said lace out of and beyond the nose of said needle, a gripper for seizing and firmly grasping the said end of said lace, means for moving said needle and said gripper to a point above said bundle, to wrap said lace in a loop about said bundle, means for rotating said needle and said gripper on an axis perpendicular to the longitudinal axis of said bundle of strands to entwine the end of said lace gripped by said gripper with the lace protruding from the nose of said needle and means thereafter severing said lace at the nose of said needle.

References Cited in the file of this patent

UNITED STATES PATENTS

| | | |
|---|---|---|
| 2,454,135 | Burns | Nov. 16, 1948 |
| 2,597,675 | Sackett | May 20, 1952 |
| 2,670,294 | Frank | Feb. 23, 1954 |
| 2,712,343 | Stanton | July 5, 1955 |
| 2,792,617 | Haller | May 21, 1957 |

FOREIGN PATENTS

| | | |
|---|---|---|
| 264,498 | Germany | Sept. 24, 1913 |
| 310,265 | Germany | Jan. 6, 1919 |
| 731,288 | Great Britain | June 8, 1955 |